(12) United States Patent
Kamel et al.

(10) Patent No.: US 7,010,661 B2
(45) Date of Patent: Mar. 7, 2006

(54) EFFICIENT SERVICE MANAGEMENT IN HOME GATEWAYS

(75) Inventors: Ibrahim Kamel, Monmouth Junction, NJ (US); Khaled Elbassioni, New Brunswick, NJ (US); Beizhong Chen, Princeton, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 619 days.

(21) Appl. No.: 10/075,514

(22) Filed: Feb. 13, 2002

(65) Prior Publication Data

US 2003/0154356 A1 Aug. 14, 2003

(51) Int. Cl.
G06F 12/00 (2006.01)

(52) U.S. Cl. .................. 711/171; 711/173; 709/226; 709/229

(58) Field of Classification Search ............. 711/170, 711/171, 172, 173, 174; 709/223, 226, 229; 700/1; 725/2, 89, 92, 145, 100; 718/104, 718/105, 106
See application file for complete search history.

(56) References Cited

U.S. PATENT DOCUMENTS

| | | | |
|---|---|---|---|
| 5,682,530 A | 10/1997 | Shimamura | 718/104 |
| 6,356,978 B1 | 3/2002 | Kobayashi et al. | 711/113 |
| 2001/0034758 A1 | 10/2001 | Kikinis | 709/203 |
| 2001/0034759 A1 | 10/2001 | Chiles et al. | 709/203 |
| 2001/0036192 A1 | 11/2001 | Chiles et al. | 370/401 |
| 2002/0002608 A1 | 1/2002 | Aspromonte et al. | 709/223 |
| 2002/0099627 A1 | 7/2002 | Igi et al. | 705/27 |
| 2002/0120685 A1* | 8/2002 | Srivastava et al. | 709/203 |
| 2003/0154346 A1* | 8/2003 | Gruner et al. | 711/130 |

OTHER PUBLICATIONS

PCT Notification of Transmittal of the International Search Report Or the Declaration; Dated Mar. 14, 2003, Applicant's reference No. 9432-152/POA, International Application No. PCT/US02/32538, 5 pages.

* cited by examiner

Primary Examiner—Brian R. Peugh
(74) Attorney, Agent, or Firm—Harness, Dickey & Pierce, PLC

(57) ABSTRACT

A method is provided for managing memory resources in a service gateway environment. The method includes: receiving a service request, the service request having an associated memory space requirement that exceeds total available memory space associated with the gateway environment; determining a number of dependent service instances for each service instance; determining an accumulative memory space requirement for each service instance; identifying a subset of service instance whose memory space requirement exceeds the memory space requirement of the service request, the subset having a minimal number of the service instances; and performing a memory resource management operation in relation to the identified subset of service instances.

17 Claims, 6 Drawing Sheets

EFFICIENT SERVICE MANAGEMENT IN HOME GATEWAYS

BACKGROUND OF THE INVENTION

The present invention relates generally to home gateways, and more particularly, to an efficient method for managing application services in a limited memory environment, such as a home gateway.

With the widespread introduction of broadband to homes, the Internet is becoming more and more popular inside homes. The Internet is used not only for connecting computing devices, but also for accessing home appliances, such as TVs, DVDs, washing machines, etc. In the near future, it is expected that many home appliances will be connected to the Internet. Remote diagnosis and configuration of these appliances is one of the many advantages that the consumer can gain from Internet connectivity. Power companies are also keeping an eye on home networking because it will allow them to provide value-added services such as energy management, remote measurement, and better power balance that reduces the likelihood of blackout.

There are several initiatives to define a specification and protocol for networks residing in the home environment, including OSGi, HAVi, UPnP, Jini, and HomeRF, to name a few. It is expected that such home networking will interoperate through a home gateway. The home gateway serves as a single point of connection between the Internet and the home. Services are implemented in software bundles that can be downloaded separately from the Internet and then executed in the gateway.

There is not consensus among the industry on whether the home gateway will be integrated into existing home appliances, distributed among several home appliances, or centralized in a separate computing device. In either case, the home gateway will more than likely have limited resources, especially main memory.

Conventional memory management techniques are not necessarily suitable for home gateways. For instance, the memory unit in a conventional computing environment is the disk page. Conventional memory management techniques typically assume that disk pages are independent.

In contrast, the services in a home gateway may not be independent, but rather can depend from each other. In other words, terminating a service will in effect terminate all of the services that depend on that service. Because of service dependencies, traditional memory management techniques are not suitable to the gateway environment.

Therefore, it is desirable to provide an efficient method for managing application services in a limited memory environment, such as a home gateway.

SUMMARY OF THE INVENTION

In accordance with the present invention, a method is provided for managing memory resources in a service gateway environment. The method includes: receiving a service request, the service request having an associated memory space requirement that exceeds total available memory space associated with the gateway environment; determining a number of dependent service instances for each service instance; determining an accumulative memory space requirement for each service instance; identifying a subset of service instance whose memory space requirement exceeds the memory space requirement of the service request, the subset having a minimal number of the service instances; and performing a memory resource management operation in relation to the identified subset of service instances.

For a more complete understanding of the invention, its objects and advantages, reference may be had to the following specification and to the accompanying drawings.

DETAILED DESCRIPTION OF THE PREFERRED EMBODIMENTS

Figure 1:
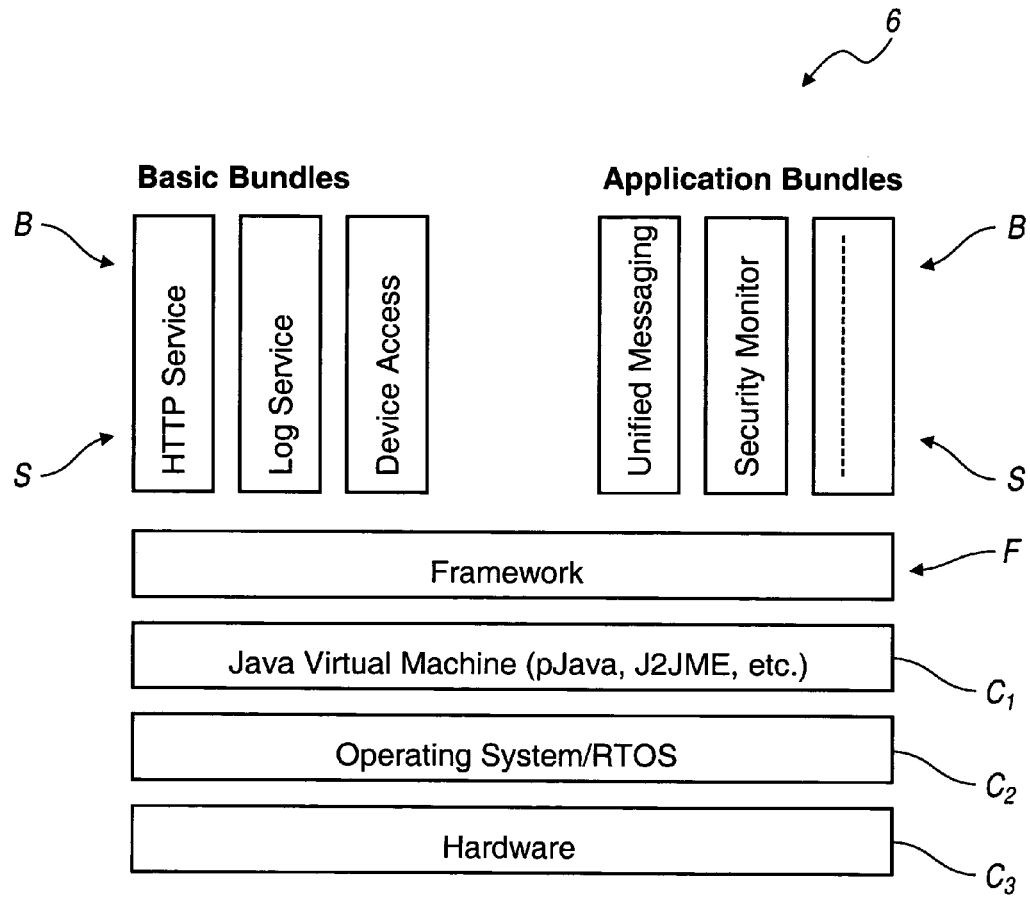
FIG. 1 is a block diagram depicting a software architecture of an exemplary service gateway in accordance with the OSGi model.

FIG. 1 illustrates the software architecture of an exemplary service gateway (G) in accordance with the OSGi model. OSGi specification defines common implementation APIs that are suitable for service gateways in a variety of different applications. While the following description is provided with reference to this particular software architecture from the OSGi model, it is readily understood that the broader aspects of the present invention encompass other software architectures as well as other known gateway specifications.

In a service gateway environment, applications are designed as a set of services (S), with each service (S) implementing a segment of the overall functionality. These services (S) and other extension services are then packaged into a software container called a bundle (B). In one example, the bundle (B) includes the service 12, which, for example may be any of the following services (S): a HTTP service (S), a Log service ($S_2$), a device access ($S_3$), a unified messaging ($S_4$), a security monitor ($S_5$), the extension services and/or other suitable services ($S_6$), as illustrated in FIG. 1. The gateway (B) can download the corresponding bundle when it becomes necessary. A framework (F) handles basic bundle management functionality. The framework (F) may associate with the following other components of the gateway: a Java Virtual Machine ($C_1$), an operating system ($C_2$) and/or hardware ($C_3$). In various examples, Java Virtual Machine ($C_1$) may implement Java, JZME or other suitable systems. In one example, the operating system ($C_2$) may implement a RTOS. In order to share its services (S) with other bundles (B), the bundle (B) can register any number of services (S) with the framework (F). An execution thread of a bundle in the framework (F) is referred to as a service instance.

To accommodate a new service, the gateway might need to free memory space associated with the gateway. Although the amount of memory required to execute a service is changing with time, the application service provider (or the author who provides the bundle) can give approximate estimates such as average and maximum amount of memory required to execute the services in a bundle. At this time, the framework has to pick a victim service instance or instances to terminate in order to fulfill the request. It is envisioned that the victim service instance might be the requesting service.

Figure 2:
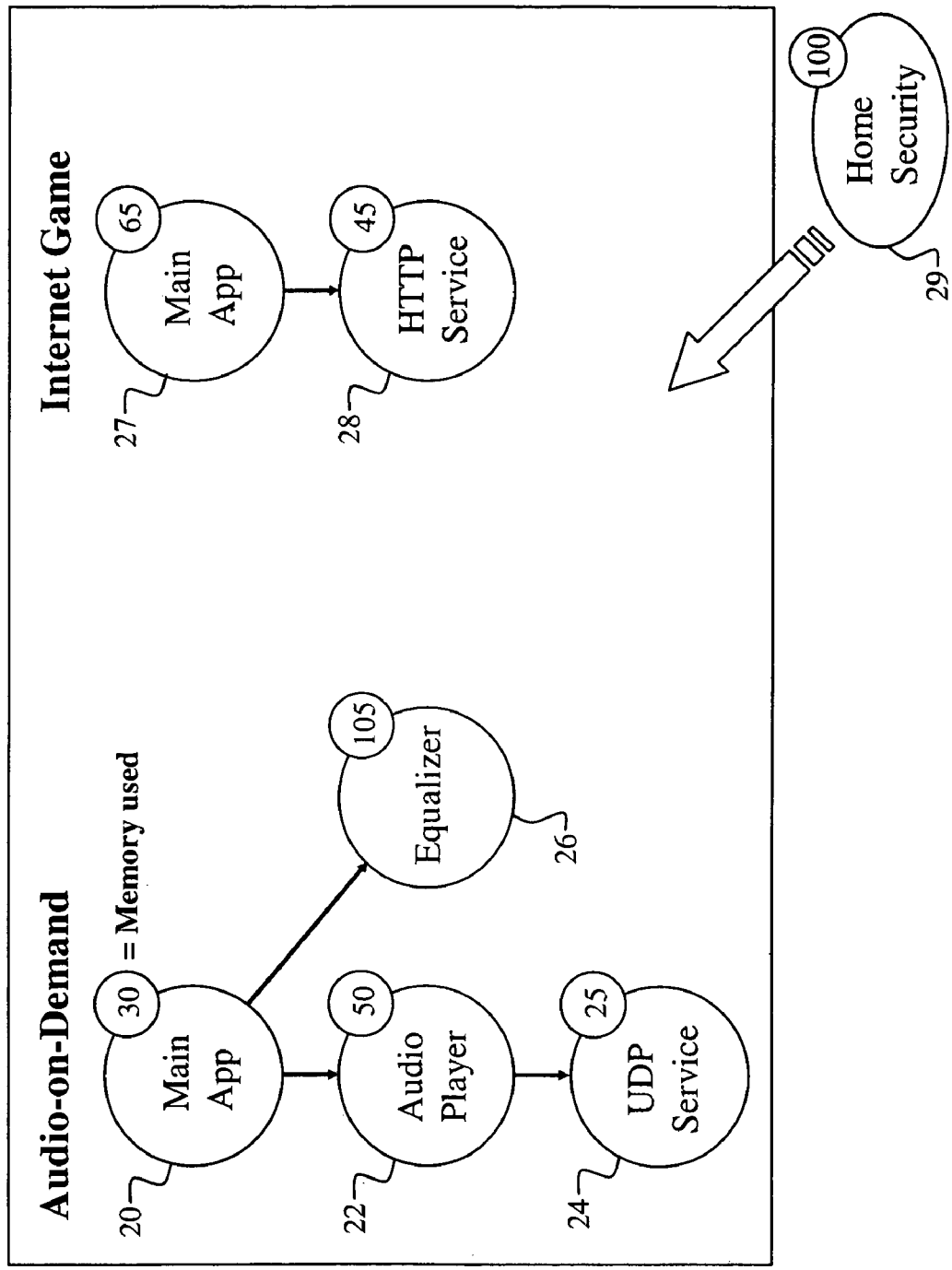
FIG. 2 is a diagram illustrating the memory resource problem of the present invention.

This memory resource problem is further illustrated by the example set forth in FIG. 2. Two exemplary applications are executing in a service gateway environment. The first application is an audio-on demand service 20 which has a memory requirement of 30 memory units. The audio-on-demand service 20 depends on an audio player service 22 which in turn depends on a UDP service 24. The audio player service 22 and the UDP service 24 have a memory requirement of 50 and 25 memory units, respectively. The audio-on-demand service 20 also depends on an equalizer service 26 which has a memory requirement of 105 memory units. The second application is a Internet game 27 which has a memory requirement of 65 memory units. The Internet game service 27 depends on an HTTP service 28 which has a memory requirement of 45 memory units.

A request is made for a third service. The third service is a home security 29 service which requires 100 memory units. Assume that the memory space requirement for the home security service exceeds the total available memory space associated with the gateway environment. Lets further assume that the home security service has a higher priority than the audio-on-demand service and the game service. Therefore, at least one of the services must be terminated to meet this request. In this example, the equalizer service 26 should be terminated because it fulfills the memory space requirement and minimizes the number of service instances that are terminated.

A formal description of the problem is set forth below. The set of service instances currently resident in gateway memory may be defined as $S=\{s_i, \ldots, s_j\}$. A dependence graph may be used to model the dependencies among bundles, where one bundle imports a service provided by another bundle. For example, let $G(S,E)$, be a directed acyclic graph with vertex set S and edge set E, describing the dependence among the service instances. There is a directed edge $(s_i, s_j) \in E$ if and only if $s_i$ depends on $s_j$. Since it is natural to assume that each application instantiates its own copy of a given service, the dependence graph will consist of a forest of rooted trees, where each tree represents the service instances instantiated by a given application. For a vertex v in G, let us denote by $T(v)$ the set of vertices of the sub-tree of G rooted at v (including v itself), and for a subset of vertices $V \subseteq S$, let $T(V):=U_{v \in V}T(v)$.

Given that a new service instance s, with a memory space requirement $M(s)$, is to be created, it might be required to terminate some existing service instances in order to make room for the new instance. Assume that the additional memory required for this operation is $M_t$ units, where $M_t=M(s)-M_f$, and $M_f$ is the current amount of available memory space. When a service instance is terminated, all instances depending on it will also be terminated. Therefore, the objective is to reduce the number of terminated service instances. More precisely, it is desired to find a subset $V \subseteq S$ of minimal number of dependants, whose termination, together with all its dependants, will make available a total memory space of at least Mt units. Letting $M(S):=\Sigma_{s \in S}M(s)$ for any $S' \subseteq S$, the problem can be formulated as of finding $\min\{|T(V)|:V \subseteq S, M(T(V)) \geq M_t\}$. In other words, the problem is to identify a minimal number of service instances whose memory space requirement exceeds the memory space requirement of a service request.

Figure 3:
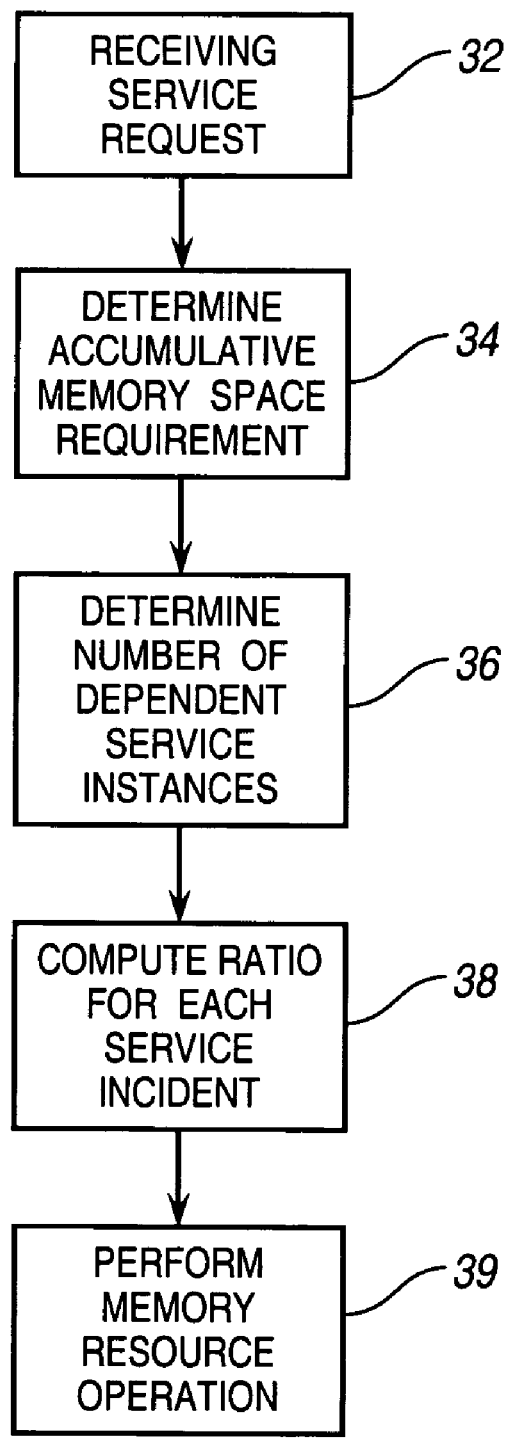
FIG. 3 is a flow chart depicting a method for managing memory resources in a service gateway environment in accordance with the present invention.

Referring to FIG. 3, a method is provided for managing memory resources in a limited memory environment, where the at least some of the service instances are dependent on other service instances. This method provides one preferred solution to the problem set forth above. The method is initiated upon receiving a service request 32, where the service request has a memory space requirement that exceeds the total available memory space associated with the gateway environment. In order to satisfy the service request, the method identifies one or more service instance(s) that are to be terminated from the environment.

First, an accumulative memory space requirement, $M(s^*)$, is determined at step 34 for each service instance resident in the gateway environment. The accumulative memory space requirement for a given service instance accounts for the memory requirement for the given service instance and each of the service instances depending from it. Thus, accumulative memory space is computed by summing the memory space requirements for the given service instance with the memory space requirement for each of the service instance that depend from it.

Second, the number of dependent service instances, $s^*$, is determined at step 36 for each service instance. A data store generally maintains dependency information for each of the service instances currently resident in the gateway environment. In an exemplary embodiment, the number of dependent services instances may be retrieved from a data store associated with the environment. For each service instance, the data store may include an identifier for a given service instance, the accumulative memory space requirement for the given service instance, and the number of service instances that depend from the given service instance. Although presently preferred, it is envisioned that other techniques may be employed for determining the accumulative memory space requirement and number of dependencies for each service instance.

Third, a ratio is computed for each service instance at step 38. The ratio is further defined as the accumulative memory space requirement for a given service instance divided by the number of dependent service instances for the given service instance. Maximizing this ratio tends to decrease the number of terminated service instances.

Lastly, a memory resource operation is then performed at step 39 in relation to the service instance having the largest ratio. Specifically, the service instance having the largest ratio and each of the services instances that depend from it are terminated. If two service instances have the same ratio, then the service instance having the fewest dependencies is selected for termination. One skilled in the art will readily recognize that the data store that maintains dependency information for each of the service instances is updated to account for the terminated service instances.

In some instance, the accumulative memory space requirement for the terminated service instance (and its dependents) may not exceed the requested memory space. In this case, the above-described process is repeated, thereby terminating additional service instances. On the other hand, once the total available memory space is equal to or exceeds the memory space requirement of the service request, the service request is satisfied.

There is also a natural generalization of problem set forth above. Suppose that different service instances differ in importance and, therefore, are assigned different priorities. In such a case, it is reasonable to assign a weight $W(s)$ to each instance. Instances with large weights are considered more important. When it is necessary to eject some instances from memory, it is desirable to reduce the number of deleted high priority instances. Thus, the problem now becomes of finding $\min\{W(T(V))/V \subseteq S, M(T(V)) \geq M_t\}$.

In the absence of dependencies, this problem is closely related to the well-known Knapsack problem. The Knapsack problem admits a pseudo polynomial algorithm which runs in $O(n^2W)$, where W is the maximum weight. Even in the case of dependencies among service instances, a similar result holds for this problem as shown below.

Figure 4:
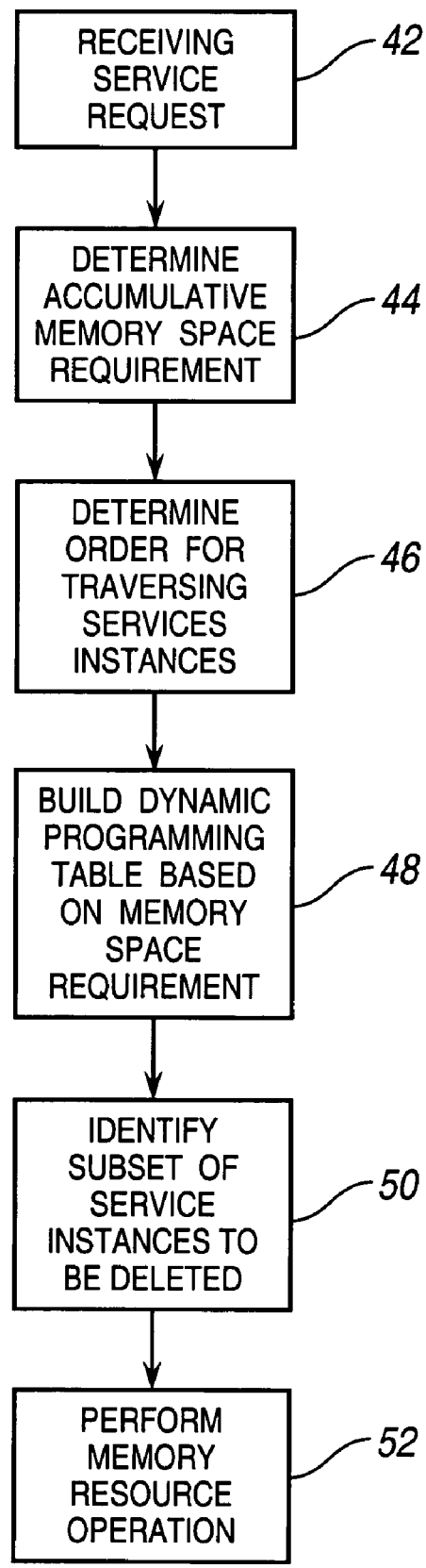
FIG. 4 is a flowchart depicting an alternative method for managing memory resources in a service gateway environment in accordance with the present invention.

In view of the foregoing, an alternative method is presented for managing memory resources in a limited memory environment, such as a service gateway. Referring to FIG. 4, the method is initiated at step 42 upon receiving a service request. In order to satisfy the service request, the method identifies one or more service instance(s) that are to be deleted from the environment. The technique generally uses dynamic programming.

An accumulative memory space requirement, $M(s^*)$, is first determined at step 44 for each service instance resident in the gateway environment. Next, an order is determined at step 46 for traversing the service instances in the gateway environment. The service instances are preferably traversed recursively in a post-order. Specifically, let $S=S_n=\{s_1, \ldots, s_n\}$ be the current set of service instances listed in post-order traversal (that is, recursively traverse the children from left to right then traverse the root). Consider incrementally the sets $S_1=\{s_1\}$, $S_2=\{s_1, s_2\}$, $S_3=\{s_1, s_2, s_3\}$, ..., computing for each set the maximum amount of memory that can be achieved by deleting a subset of service instances at given number of dependents. In order to compute these maxima, compute for each node $s_i$, the largest index $k \in \{1, \ldots, i-1\}$ such that $S_k$ is not a descendant of $s_i$. Let $L(s_i)$ denote such an index. The procedure gives the post-order traversal of a given forest and computes the required indices $L(s_i)$ for each $i=1, \ldots, n$.

For instance, an exemplary procedure for post-order traversal of a given subtree of the dependence forest G rooted a v and an integer k, is as follows:
1. If $|T(v)|=0$ // tree is empty return.
2. If $|T(v)|=1$ // v is a leaf node
   $L(v) \leftarrow k$.
3. else for each child u of v:
   traverse (u,G,k);
4. $L(v) \leftarrow L(\text{leftmost}(v))$;
5. $k \leftarrow k+1$;
6. $s_k \leftarrow V$.

This procedure yields the post order-traversal traversal $\{s_k, s_{k+1}, \ldots, s_{|T(v)|+k-1}\}$ of $T(v)$, and the set of indices $\{L(s)|s \in T(v)\}$.

If the connected components of the forest G are $C_1, C_2, \ldots, C_r$, then in order to compute the post-order traversal for G, the above procedure is called r times:
1. Find the connected components $C_1, C_2, \ldots, C_r$ of G.
2. $k \leftarrow 0$.
3. For i=1 to r
   traverse(root($C_j$), G, k).

Figure 5:
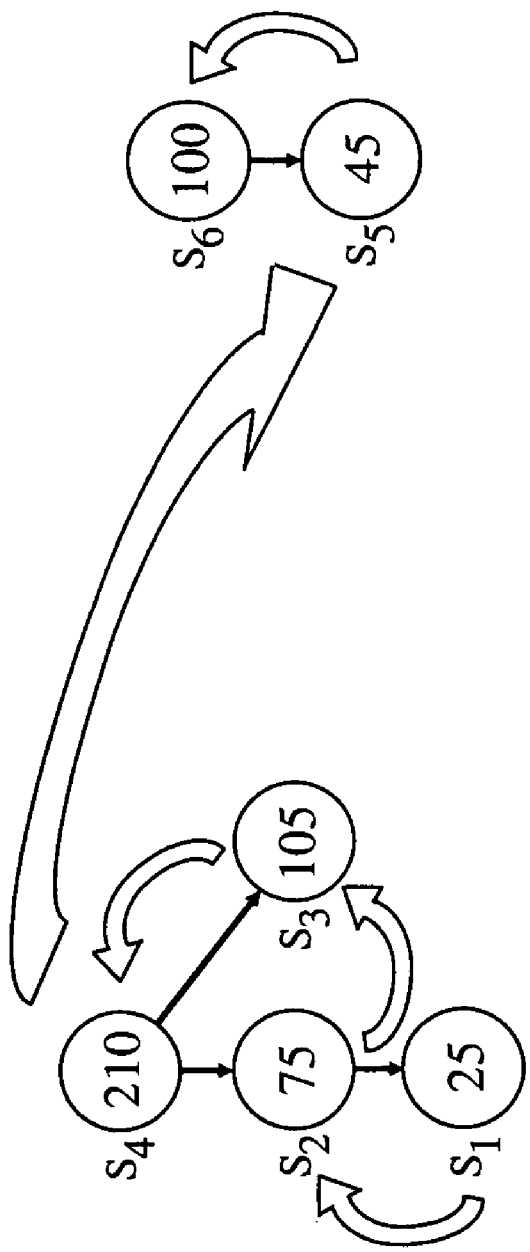
FIG. 5 is a diagram illustrating a post-order traversal of a plurality of service instances in accordance with the present invention.

Thus, this procedure yields the post-order traversal $\{s_1, s_2, \ldots, s_n\}$ of G, and the set of indices $\{L(s)|s \in V(G)\}$. This procedure is illustrated briefly in FIG. 5. However, it is envisioned that other traversal orders are also with the scope of the present invention.

Returning to FIG. 4, a dynamic programming table is then built at step 48, such that the entries in the table indicate an amount of memory space that can be attained by deleting a subset of the service instances. In what follows, nodes $u, v \in V(G)$, will be said to be incomparable if neither is a descendant of the other, i.e., $v \notin T(u)$ and $u \notin T(v)$. Note that n is a trivial upper bound on the total number of instances (or weight) that can be achieved by any solution. For each $i \in \{1, \ldots, n\}$ and each $w \in \{1, \ldots, n\}$, let $S_{i,w}$ denote a subset, of incomparable elements of $S_i=\{s_1, \ldots, s_i\}$, whose total weight is exactly w, and whose total memory is maximized. Let $A(i, w)=M(T(S_{i,w}))$ if the set $S_{i,w}$ exists, and $A(i, w)=-\infty$ otherwise:

$$A(i, w) = \begin{cases} -\infty & \text{if there is no set } S \subseteq S_i \text{ of incomparable} \\ & \text{elements such that } |T(S)| = w, \\ 0 & \text{if } i = 0 \text{ or } w = 0, \\ \max\{M(T(S)) \mid S \subseteq S_i, |T(S)| = w, \text{ elements of} \\ & S \text{ are incomparable}\}, \text{ otherwise.} \end{cases}$$

Figure 6:
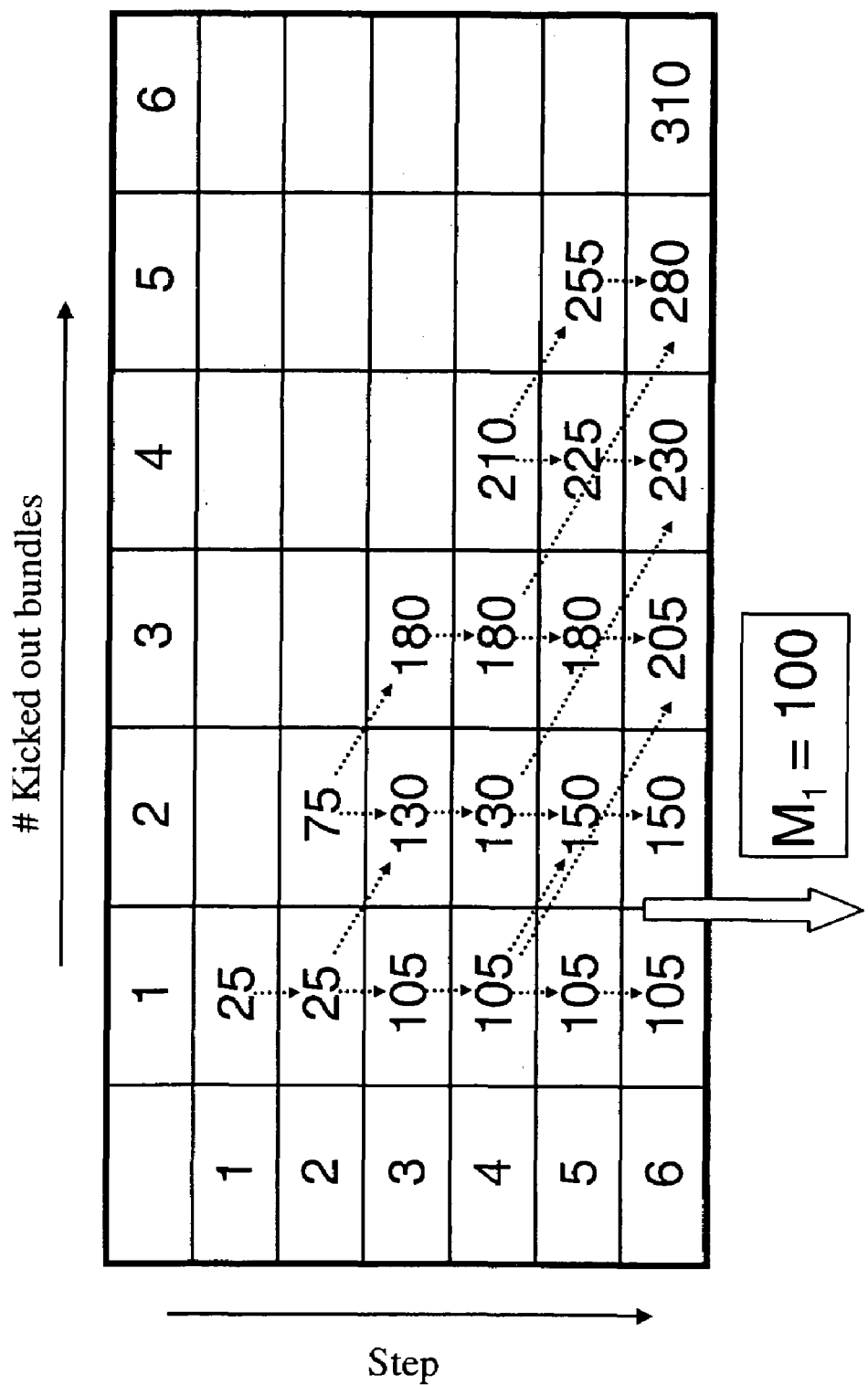
FIG. 6 is a diagram illustrating an exemplary dynamic programming table in accordance with the present invention.

The dynamic programming table is constructed such that each row of the table correlates to a subset of service instances in accordance with the post-order and each column correlates to a number of service instances that are to be deleted from the subset. Specifically, A(1, w) is known for every $w \in \{1, \ldots, n\}$; whereas the other values of A(i, w) can be computed incrementally using the following recurrence: $A(i+1, w)=\max\{A(i, w), M(s_{i+1})+A(L(s_{i+1}), w-|T(S_{i-1})|)\}$, if $|T(s_{i+1})|<w$ and $A(i+1, w)=A(i, w)$ otherwise. As a result, each entry in the table indicates a maximum amount of memory space that can be attained by deleting the corresponding number of service instances from the corresponding subset of service instances. An exemplary dynamic programming table is shown in FIG. 6.

Lastly, one or more service instances are identified using the dynamic programming table at step 50. In particular, the service instances are identified by evaluating from left to right the bottom row of the table. The first table entry whose value (i.e., memory space) exceeds the memory space of the service request is selected, where the table entry correlates to a subset of service instances with a number of service instances to be deleted. The corresponding subset of service instances are then deleted at step 52, thereby fulfilling the service request.

A more formal description of this alternative algorithm is as follows:
1. For each node $s \in S$, compute the accumulative size and memory:
   $c(s) \leftarrow |T(s)|$ and $m(s) \leftarrow M(T(s))$.
2. Call Traverse-forest (G) to get the post-order traversal $\{s_1, s_2, \ldots, s_n\}$ of G, and the set of indices $\{L(s)|s \in V(G)\}$.
3. Initialize:
   $A(i, 0)=0$ for all $i=1, \ldots, n$,
   $A(0, w)=0$ for all $w=1, \ldots, n$,
   $A(1, 1)=m(s_1)$, and $A(1, w)=-\infty$ for all $w=2, \ldots, n$.
// build dynamic programming table
4. For i=1 to n
5. For w=1 to n
   if $c(s_{i+1})<w$
     if $A(i, w) \geq m(s_{i+1})+A(L(s_{i+1}), w-c(s_{i+1}))$
       $A(i+1, w) \leftarrow A(i, w)$;
       $B(i+1, w) \leftarrow 0$
     else
       $A(i+1, w) \leftarrow m(s_{i+1})+A(L(s_{i+1}), w-c(s_{i+1}))$;
       $B(i+1, w) \leftarrow 1$
   else
     $A(i+1, w) \leftarrow A(i, w)$;
   $B(i+1, w) \leftarrow 0$.
// compute optimal solution 6. $S \leftarrow \emptyset$; $i \leftarrow n$; $k \leftarrow \min\{w \in [n]: A(i, w) \geq Mt.\}$.
7. While $i > 0$
8. if $B(i, k) = 1$
    $S \leftarrow S \cup \{s_i\}$; $i \leftarrow L(s_i)$; $k \leftarrow k - c(s_i)$.
   else
    $i \leftarrow i - 1$.
9. For each $s \in S$, delete $T(s)$.

As will be apparent to one skilled in the art, an $O(n^2)$ time and $O(n^2)$ space is required for solving this problem in accordance with this alternative algorithm.

The foregoing discloses and describes merely exemplary embodiments of the present invention. One skilled in the art will readily recognize from such discussion, and from accompanying drawings and claims, that various changes, modifications, and variations can be made therein without departing from the spirit and scope of the present invention.

The invention claimed is:

1. A method for managing memory resources in a service gateway environment, the service gateway environment having a plurality of service instances where at least one of the plurality of service instances being dependent on another service instance of the plurality of service instances, comprising:
   receiving a service request, the service request having an associated memory space requirement that exceeds total available memory space associated with the service gateway environment;
   determining a number of dependent service instances for each service instance of the plurality of service instances;
   determining an accumulative memory space requirement for each service instance of the plurality of service instances, the accumulative memory space requirement accounting for service instances that depend from a given service of the plurality of service instances;
   identifying a subset of service instances of the plurality of service instances whose memory space requirement exceeds the memory space requirement of the service request, the identified subset of service instances having a minimal number of the service instances of the plurality of service instances; and
   performing a memory resource management operation in relation to the identified subset of service instances.

2. The method of claim 1 wherein the step of performing a memory resource management operation further comprises deleting the identified subset of service instances of the plurality of service instances.

3. The method of claim 1 wherein the step of identifying a subset of service instances further comprises determining a ratio for each service instance of the plurality of service instances, where the ratio is defined as the accumulative memory space requirement divided by the number of dependent service instances, and selecting the service instance of the plurality of service instances having the largest ratio and each of the service instances that depend from the service instance of the plurality of service instances having the largest ratio.

4. The method of claim 1 wherein the step of identifying a subset of service instances further comprises determining an order for traversing the plurality of service instances; building a dynamic programming table for the plurality of service instances, such that the entries in the table indicate an amount of memory space that can be attained by deleting a subset of the service instances of the plurality of service instances; and identifying one or more service instances of the plurality of service instances that are to be deleted using the dynamic programming table.

5. The method of claim 1 wherein the step of determining an accumulative memory space requirement further comprises summing memory space requirements for each service instance with memory space requirements for each of the active services instances that depend from the given active service instance.

6. A method for managing memory resources in a service gateway environment, the service gateway environment having a plurality of service instances, comprising:
   (a) receiving a service request, the service request having an associated memory space requirement that exceeds total available memory space associated with the service gateway environment;
   (b) determining an accumulative memory space requirement for each service instance of the plurality of service instances;
   (c) determining a number of dependent service instances for each service instance of the plurality of service instances;
   (d) determining a ratio for each service instance, of the plurality of service instances, where the ratio is defined as the accumulative memory space requirement divided by the number of dependent service instances; and
   (e) performing a memory resource management operation in relation to the service instance of the plurality of service instances having the largest ratio.

7. The method of claim 6 wherein the step of performing a memory resource management operation further comprises deleting the service instance of the plurality of service instances having the largest ratio and each of the services instances that depend from the service instance of the plurality of service instances having the largest ratio.

8. The method of claim 7 further comprises:
   determining the total available memory space associated with the service gateway environment, after the step of deleting the service instance;
   determining whether the memory space requirement of the service request exceeds the total available memory space associated with the service gateway environment; and
   repeating steps (b) thru (e) when the memory space requirement of the service request exceeds the total available memory space associated with the service gateway environment.

9. The method of claim 8 further comprises the step of performing the service request when the memory space requirement of the service request is less than or equal to the total available memory space associated with the service gateway environment.

10. The method of claim 6 wherein the step of determining an accumulative memory space requirement further comprises summing memory space requirements for a given service instance of the plurality of service instances with memory space requirements for each of the services instances that depend from the given service instance of the plurality of service instances.

11. The method of claim 6 further comprises maintaining a data store for the plurality of service instances, wherein the data store includes an identifier for a given service instance of the plurality of service instances, the accumulative memory space requirement for the given service instance of the plurality of service instances, and the number of service instances that depend from the given service instance of the plurality of service instances.

12. A method for managing memory resources in a service gateway environment, the service gateway environment having a plurality of service instances, comprising:
receiving a service request, the service request having an associated memory space requirement that exceeds total available memory space associated with the service gateway environment;
determining an accumulative memory space requirement for each service instance in the service gateway environment;
determining an order for traversing the plurality of service instances;
building a dynamic programming table for the plurality of service instances, such that the entries in the dynamic programming table indicate an amount of memory space that can be attained by deleting a subset of the service instances; and
identifying one or more service instances of the plurality of service instances that are to be deleted using the dynamic programming table.

13. The method of claim 12 further comprises the step of deleting the identified service instances, thereby managing memory resources in the service gateway environment.

14. The method of claim 12 wherein the step of determining an accumulative memory space requirement further comprises summing memory space requirements for a given service instance of the plurality of service instances with memory space requirements for each of the services instances that depend from the given service instance of the plurality of service instances.

15. The method of claim 12 wherein the step of determining an order for traversing further comprises recursively traversing service instances of the plurality of service instances in a post-order.

16. The method of claim 15 where the step of building a dynamic programming table further comprises defining each row in the table to correlate to a subset of the service instances of the plurality of service instances in accordance with the post-order and defining each column in the table to correlate to a number of service instances of the plurality of service instances that are to be deleted from the subset of service instances of the plurality of service instances, such that each entry in the table indicates a maximum amount of memory space that can be attained by deleting the corresponding number of service instance of the plurality of service instances from the corresponding subset of service instances of the plurality of service instances.

17. The method of claim 12 wherein the step of identifying one or more service instances of the plurality of service instances that are to be deleted further comprises evaluating from left to right the entries of a bottom row of the dynamic programming table and selecting service instances of the plurality of service instances that correspond to an entry whose memory space exceeds the memory space requirement of the service request.

* * * * *